Oct. 27, 1936.   T. M. MYRACLE   2,059,175
RELEASABLE COUPLING
Filed Sept. 8, 1933
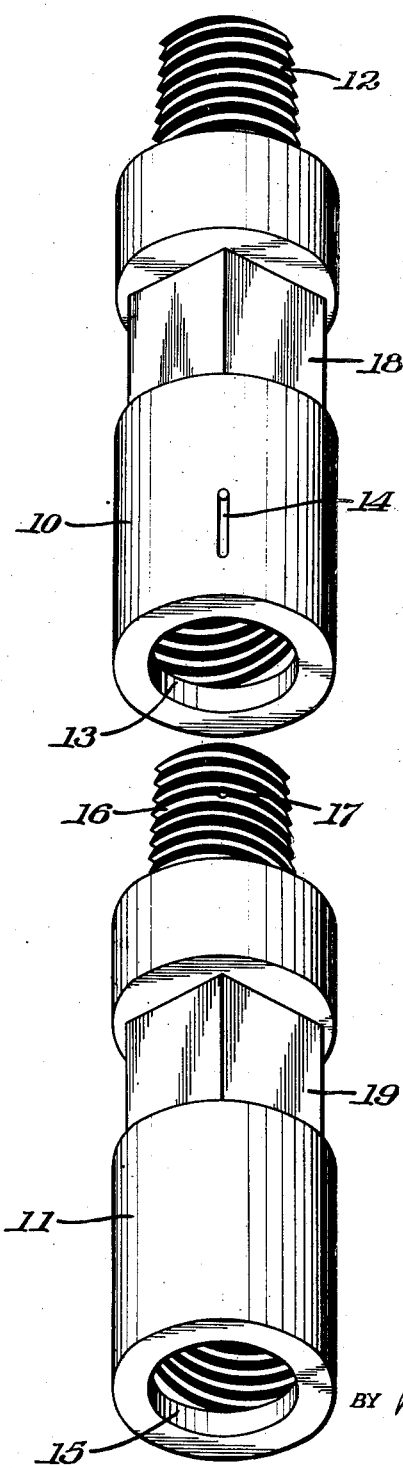
TRUEMAN M. MYRACLE
INVENTOR
BY
HIS ATTORNEY Patented Oct. 27, 1936

2,059,175

UNITED STATES PATENT OFFICE 2,059,175

RELEASABLE COUPLING

Trueman M. Myracle, Electra, Tex., assignor to The Texas Company, New York, N. Y., a corporation of Delaware Application September 8, 1933, Serial No. 688,569

2 Claims. (Cl. 287—125)

This invention relates to a coupling device, more particularly to a device to be used in connecting the lower end of a string of pump or sucker rods to the movable member of a well pump, such as the plunger or traveling valve, and has for its object the provision of a device by means of which the sucker rods will be securely attached to the pump plunger during normal operation but which will allow this connection to be released in case it is desired to detach or remove the sucker rods while leaving the pump in the well.

In well pumping it is not infrequent that the pump plunger or the traveling valve becomes sanded so that it will stick in the working barrel of the pump and in such cases it is usually necessary that the rods and tubing be pulled from the well at the same time and this naturally causes considerable loss of time and quite often a loss of equipment since many of the rods may have to be sawed in two before they can be removed from the tubing. It is quite customary to join the sections of the sucker rods together by means of right hand threaded screw connections and it often occurs that the sections of the rods become unscrewed due to twisting or vibration, so that they will part. The usual procedure when the rods part in this manner is to screw them back together again by lowering the upper section slightly and revolving that section in a right hand direction, thus causing the joint to make up again.

In accordance with my invention I have provided releasable connecting means between the lowermost sucker rod and the plunger or traveling valve, this means comprising a coupling having a left hand screw connection together with means for allowing this connection to become disengaged when the necessity arises.

For a further understanding of my invention reference may be had to the accompanying drawing in which the single figure is a view in perspective of a coupling comprising my invention.

Referring to the drawing, I have illustrated my coupling as comprising two main parts, an upper member 10 and a lower member 11. The upper coupling member 10 is formed at one end with a right hand threaded stud 12 adapted to engage the lower end of a string of sucker rods correspondingly threaded (not shown), and at its other end with a socket 13 provided with left hand threads. A lock or shear pin 14 is shown as projecting from the side of the socket 13 for a purpose which will be explained hereinafter.

The lower coupling member 11 is provided at one end with a socket 15 provided with internal right hand screw threads adapted to engage a pump plunger or traveling valve of the pump (not shown). The other end of the lower coupling member 11 is provided with a left hand threaded stud 16 adapted to engage the socket 13 of the upper coupling member to form a tight screw connection. The stud 16 is provided with a small hole 17 passing laterally through the stud and positioned so as to be in alignment with the lock pin 14 when the upper and lower coupling members are screwed tightly together. The upper and lower coupling members may be provided with cut-out flat portions 18 and 19 adapted to be engaged by suitable wrenches.

After the lower member 11 has been attached to the pump plunger, the stud 16 and the socket 13 are threaded together to make a tight joint. The lock or shear pin 14 is then forced through the socket 13 and the hole 17 in the stud 16, thus locking this joint. The string of sucker rods can then be screwed onto the stud 12 of the upper member 10.

In case the sucker rod sections should become parted it is merely necessary to lower the upper section slightly and revolve that section in a right hand direction, thus causing the parted joint to make up again. When this occurs the lock pin 14 will prevent the left hand threaded joint between the stud 16 and the socket 13 from becoming disengaged and the sucker rod string will then be again in position to be used. However, should it be necessary, because of the sticking of the pump plunger or for some other reason, to disconnect the sucker rods from the pump, it will be necessary merely to turn the sucker rods in a right hand direction with a force greater than would be required in tightening the joint between the sucker rod sections. This additional force will cause the pin 14 to be sheared, allowing the socket 13 to unscrew from the stud 16, and thus disengaging the coupling.

It is to be understood that the lock pin 14 will be made from a metal which can be sheared and must be of such size that the amount of pressure applied on the rods at the surface to tighten up the right hand joint will not shear the pin, but that a force appreciably greater when applied to the rods at the surface will be sufficient to shear the pin, allowing the rods to be released at the desired point.

Obviously many modifications and variations of the invention, as hereinbefore set forth, may be made without departing from the spirit and scope thereof, and therefore only such limitations should be imposed as are indicated in the appended claims.

I claim:

1. In a device for coupling a string of sucker rods to a pump plunger in which said sucker rod string comprises a plurality of sections secured together by means of right hand threaded screw connections, a member provided at one end with a right hand threaded stud to engage the lower end of the sucker rod string, a second member provided at one end with a right hand threaded socket to engage the upper end of the pump plunger, said members being provided at their adjacent ends with left hand threads to form a screw connection, and means for locking said screw connection to resist right hand stresses occurring in said sucker rods when said right hand threaded connections are tightened, said locking means being disengageable upon the application of a predetermined greater right hand stress in said sucker rods.

2. In a device for coupling a string of sucker rods to a pump plunger in which said sucker rod string contains a plurality of right hand threaded joints, a member provided at one end with right hand screw threads to engage the lower end of the sucker rod string, a second member provided at one end with right hand screw threads to engage said pump plunger, said members being provided at their adjacent ends with a left hand threaded screw connection, and a shear pin passing laterally through said left hand screw connection, the arrangement being such that on the application of a right hand stress to said sucker rod string greater than that necessary to securely tighten said right hand threaded joints in said string, said pin will be sheared allowing said left hand threaded screw conection to be unthreaded.

TRUEMAN M. MYRACLE.